United States Patent
O'Connor et al.

(10) Patent No.: US 12,471,998 B2
(45) Date of Patent: Nov. 18, 2025

(54) AUTOMATED PEDICLE SCREW PLANNING

(71) Applicant: NuVasive, Inc., San Diego, CA (US)

(72) Inventors: Sean O'Connor, San Diego, CA (US); Adrien Ponticorvo, San Diego, CA (US); Samuel Kadoury, Mont-Royal (CA); William Trung Le, Montreal (CA)

(73) Assignee: NuVasive, Inc., San Diego, CA (US)

( * ) Notice: Subject to any disclaimer, the term of this patent is extended or adjusted under 35 U.S.C. 154(b) by 386 days.

(21) Appl. No.: 18/149,562

(22) Filed: Jan. 3, 2023

(65) Prior Publication Data

US 2024/0216067 A1    Jul. 4, 2024

(51) Int. Cl.
*A61B 34/10*    (2016.01)

(52) U.S. Cl.
CPC ........ *A61B 34/10* (2016.02); *A61B 2034/105* (2016.02); *A61B 2034/107* (2016.02); *A61B 2034/108* (2016.02)

(58) Field of Classification Search
CPC ........ A61B 2034/108; A61B 2090/376; A61B 34/10; A61B 2034/107
See application file for complete search history.

(56) References Cited

U.S. PATENT DOCUMENTS

| | | |
|---|---|---|
| 10,893,912 B2 | 1/2021 | Crawford et al. |
| 11,350,995 B2 | 6/2022 | Finley et al. |
| 2017/0165008 A1 | 6/2017 | Finley |
| 2021/0186617 A1 | 6/2021 | Gorek et al. |
| 2022/0296326 A1 | 9/2022 | Deng et al. |
| 2022/0375079 A1 | 11/2022 | Finley et al. |
| 2024/0299095 A1* | 9/2024 | Widmer ............ A61B 17/7092 |

FOREIGN PATENT DOCUMENTS

WO    2021/061878    4/2021

OTHER PUBLICATIONS

Knez et al., "Computer-Assisted Pedicle Screw Placement Planning: Towards Clinical Practice", IEEE International Symposium on Biomedical Imaging, Apr. 2018, 5 pages.
Schroeder et al., "Flying Edges: A High-Performance Scalable Isocontouring Algorithm", 5th IEEE Symposium on Large Data Analysis and Visualization, Oct. 2015, 9 pages.
Deb et al., "A fast and elitist multiobjective genetic algorithm: NSGA-II", IEEE Transactions on Evolutionary Computation, vol. 6, Issue 2, Apr. 2002, pp. 182-197.
(Continued)

*Primary Examiner* — Samuel S Hanna

(57) ABSTRACT

Systems and methods for automatically determining pedicle screw trajectories for surgery may be provided. A scan of a spine may be received, and positions of one or more vertebra and one or more components of the one or more vertebra in the scan may be identified. Next, a screw trajectory planning algorithm may determine an initial screw trajectory plan using the positions of the one or more vertebra and the one or more components. The screw trajectory planning algorithm may then determine a revised screw trajectory plan by revising the initial screw trajectory plan according to weighted factors.

12 Claims, 9 Drawing Sheets

(56) References Cited

OTHER PUBLICATIONS

Liu et al., "The accuracy and effectiveness of automatic pedicle screw trajectory planning based on computer tomography values: an in vitro osteoporosis model study", BMC Musculoskeletal Disorders (2022) 23:165, 9 pages.
Jiang et al., "Pedicle screw accuracy assessment in ExcelsiusGPS robotic spine surgery: evaluation of deviation from pre-planned trajectory", Chinese Neurosurgical Jornal (2108):4:23, pp. 118-123.
Vijayan et al., "Automatic pedicle screw planning using atlas-based registration of anatomy and reference trajectories", Phys Med Biol; 64(16):165020, Dec. 7, 2021, doi: 10.1088/1361-6560/ab2d66, author manuscript HHS public access, 32 pages.
Ma et al., "A novel surgical planning system using an AI model to optimize planning of pedicle screw trajectories with highest bone mineral density and strongest pull-out force", Neurosurgical Focus 52(4):E10, 2022, 6 pages.

\* cited by examiner

AUTOMATED PEDICLE SCREW PLANNING

BACKGROUND

Pedicle screws are used in spinal fusion procedures to aid in stabilization of the spine. One or more pedicle screws are typically placed above and below the disc space where fusion is to occur. Rods are used to connect the pedicle screws in a manner that reduces movement of the vertebrae to facilitate fusion. Surgeons may plan pedicle screw trajectories and sizes using a pre-operative or intra-operative imaging modality. The planning process can be time consuming and complex, especially for surgeries that involve using a large number of pedicle screws. In the case of surgeries that utilize increasingly popular assistive technologies like surgical navigation or surgical robots, a surgical plan is typically manually input into the assisting devices, which can further hinder the surgical workflow. Automating the planning process would provide significant benefit to surgeons.

Optimal screw selection and screw placement vary from case to case. Thus, it would be beneficial for an automatic planning process to account for a variety of surgical techniques, screw selection, and screw placement.

Three types of strategies for automating pedicle screw planning are commonly used today. One strategy, the so-called atlas technique, includes creating an average vertebral body at each level and then defining a pedicle screw trajectory for that level based on the average vertebral body. Scans of a patient must then be mapped to the original screw trajectory using the average vertebral body (or vice versa), typically using established landmarks. The second common strategy employs a machine-learning model that is trained to determine screw trajectories using data obtained from a number of previous cases. Once trained, the model generates pedicle screw trajectories for new scans. Both techniques require annotation from an expert to define ideal pedicle screw trajectories, however for the atlas technique, the average vertebral bodies must be annotated. The annotated screw placement is then used to guide future planned trajectories. For the machine learning model, the training set needs to either be annotated or inferred from the placement of screws in a post-op scan. Consequently, the two techniques are biased by the original annotators and scans used for training, and future predictions may not match the planned trajectories for different surgeons.

A third strategy for automatic pedicle screw planning includes geometric approaches using bone mass density. An example of this is described by Knez et al., Computer-Assisted Pedicle Screw Placement Planning: Towards Clinical Practice, IEEE International Symposium on Biomedical Imaging (April 2018).

SUMMARY

In an example, a method for generating custom pedicle screw trajectories involves receiving a scan of a spine; identifying positions of one or more vertebra and one or more components of the one or more vertebra in the scan, including any one of (i) an endplate, (ii) a pedicle, (iii) laminae, (iv) facets, and (v) a combination of (i)-(iv); determining, by a screw trajectory planning algorithm, an initial screw trajectory plan using the positions of the one or more vertebra and the one or more components; and determining, by the screw trajectory planning algorithm, a revised screw trajectory plan by revising the initial screw trajectory plan according to weighted factors. Identifying positions of the one or more vertebra and components may include using a vertebral segmentation machine learning model. The initial screw trajectory plan may include an initial position and initial orientation for pedicle screws having a predetermined pedicle screw length and a predetermined pedicle screw diameter. Determining the initial screw trajectory plan may include performing an atlas technique. The weighted factors may comprise weights assigned to parameters associated with any one of (a) a screw length, (b) a screw width, (c) a medial entry angle, (d) a cranial entry angle, (e) an entry point, and (f) any combination of (a)-(f). The method may further include receiving a selection, from a user, of the weighted factors. The weighted factors may be associated with a pedicle screw insertion technique, wherein the pedicle screw insertion technique is any one of a Magerl technique, a Roy-Camile technique, an Anderson technique, an Ann technique, an anatomical technique, or a modified technique. The method may further include receiving one or more completed screw trajectory plans; and determining the weighted factors using the one or more completed screw trajectory plans. The algorithm can be run forwards or backwards. A user or system can adjust weights to determine a screw trajectory plan or can take a screw trajectory plan and calculate the weights needed to recreate that plan. The method may further include providing the initial screw trajectory plan to a user; and receiving one or more modifications to the initial screw trajectory plan, wherein determining the revised screw trajectory plan includes using the one or more modifications. The revised screw trajectory plan may include a screw inventory that includes one or more amounts of screws of one or more screw dimensions for performing the revised screw trajectory plan. The method may further include causing a robotic system to position a robotic component based on the revised screw trajectory plan.

In an example, there is a system. The system may include a computing device comprising one or more processors and a memory, wherein the memory comprises instructions that, when executed by the one or more processors, causes the one or more processors to receive a scan of a spine; identify positions of one or more vertebra and one or more components of the one or more vertebra in the scan, including any one of (i) an endplate, (ii) a pedicle, (iii) laminae, (iv) facets, and (v) a combination of (i)-(iv) ; determine an initial screw trajectory plan using the positions of the one or more vertebral bodies and the one or more components; and determine a revised screw trajectory plan by revising the initial screw trajectory plan according to weighted factors. The system may further include a display configured to display images, wherein the memory comprises further instructions that, when executed by the one or more processors, causes the one or more processors to render one or more guide-lines on an image of the spine for screw insertion using the revised screw trajectory plan; and cause the display to display the image of the spine with one or more guide-lines. The initial screw trajectory plan may include an initial position and initial orientation for pedicle screws; and the revised screw trajectory plan may include a screw inventory that includes one or more amounts of screws of one or more screw dimensions for performing the revised screw trajectory plan. The weighted factors may comprise weights assigned to parameters associated with any of (a) a screw length, (b) a screw width, (c) a medial entry angle, (d) a cranial entry angle, (e) an entry point, and (f) any combination of (a)-(e). The weighted factors may be associated with a pedicle screw insertion technique. The memory may comprise further instructions that, when executed by the one or more processors, causes the one or more processors to receive one or more completed screw trajectory plans; and determine the weighted factors using the one or more completed screw trajectory plans. The memory may comprise further instructions that, when executed by the one or more processors, causes the one or more processors to provide the initial screw trajectory plan to a user; receive one or more modifications to the initial screw trajectory plan, wherein determining the revised screw trajectory plan includes using the one or more modifications. The system may further include one or more screws having screw dimensions suitable for insertion according to the revised screw trajectory plan.

DETAILED DESCRIPTION

Figure 1:
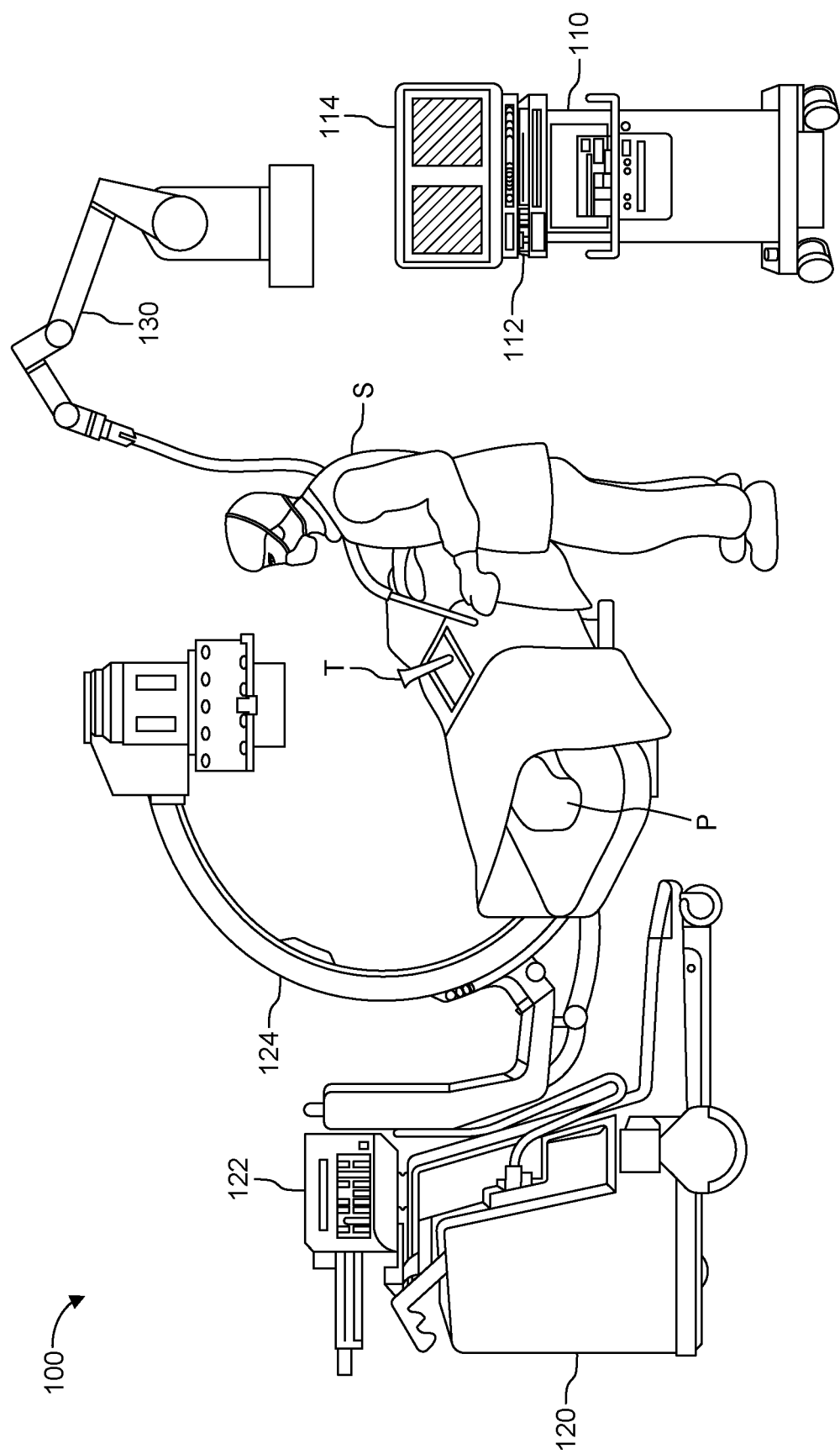
FIG. 1 illustrates an example pedicle screw planning system in an operating environment.

Disclosed examples include methods and systems for determining pedicle screw trajectories. A pre-operative or intraoperative scan of the patient can be segmented to localize and segment individual vertebrae and vertebral components in the scan. The exterior surface meshes of each vertebral segmentation volume are computed and its properties can be analyzed. Based on at least the scan of the patient, an initial screw trajectory plan is determined. That initial plan is then modified to form an optimized pedicle screw plan. For instance, the initial screw plan is modified according to various constraints and optimization parameters.

The segmentation (e.g., using raw machine learning model or manual annotations) is used to identify parts of the vertebra, such as vertebral bodies, endplates (and distinguishing between upper and lower endplates), and pedicle channels, spinous processes, transverse processes, facets, laminae, orientation of vertebral level (e.g. body-centered coordinates, cranial/caudal, patient's left/right, patient's anterior/posterior), geometric properties of identified regions (e.g., centroid location, minimum location, maximum location), midline of spine (e.g., to separate patient's left side from right side), other locations, or combinations thereof. In certain embodiments, the systems and methods for segmenting three-dimensional (3D) medical images described in US20220375079A1 (filed as U.S. Ser. No. 17/761,934 on Sep. 24, 2020), the contents of which are incorporated by reference herein, are used.

The initial screw trajectory can be determined relative to the position of the segmented parts. The initial screw trajectory plan can include initial screw trajectories with initial positions and initial orientations, initial screw lengths, and/or initial screw widths. In some examples, the initial screw plan is determined manually, such as by receiving input from a clinician. In addition or instead, the initial screw trajectory plan is determined automatically, such as by using an atlas technique or a machine learning model. In an example implementation, the machine learning model is a Deep Neural Network (DNN) that a pedicle screw planning system uses to determine the initial screw trajectory plan. The initial screw trajectory plan can be used for different surgeons because the position of anatomical landmarks are generally agreed upon by surgeons even though the preferred trajectories relative to those landmarks may differ.

The initial screw trajectory plan can then be automatically optimized based on factors. The factors can include a length of the screw, a width of the screw, a medial entry angle, a cranial entry angle, an optimal entry point, and/or the like. In some embodiments, the factors are weighted, such as using a lookup table or an algorithm. For example, the algorithm quantifies points along the surface of the vertebral body and determines the weight for the optimal entry point factor based on the ease of placing a screw at a given location using the points. The weighted factors can be predetermined for commonly used strategies for pedicle screw placement. For example, the screw trajectory planning system predetermines weights for various screw placement techniques, such as the Magerl technique, the Roy-Camile technique, the Anderson technique, the Ann technique, an anatomical technique, a modified technique, other techniques, or combinations thereof. Custom weighting factors can also be determined and assigned to match the preferences of a particular surgeon. In some embodiments, the options for different techniques are presented to the surgeon with each scan and applied based on the surgeon's selection. The revised screw trajectory plan includes revised screw trajectories with revised positions and revised orientations, revised screw lengths, and/or revised screw widths. In an example implementation, the algorithm can be updated to better determine the weights based on produced revised screw trajectories, specifically to emphasize a stable entry point to avoid screw skiving for example. For example, the algorithm may receive successful or otherwise optimal revised screw trajectories the algorithm previously produced or optimal revised screw trajectories that represent improvements on screw trajectories the algorithm previously produced. The algorithm then can be configured such that the generation of subsequent revised screw trajectory plans are based on the successful revised screw trajectories. In certain implementation, custom weighting factors can be used to generate a novel screw plan that optimizes constraints that are not visible to surgeons.

A user, such as a surgeon, can use the revised screw trajectory plan for manually inserting screws during surgery. In some embodiments, the surgeon uses surgical navigation systems that display the algorithm's output trajectory as a guide-line or graphic for the surgeon to follow during placement. A user, such as a surgeon, can also use the revised screw plan for inserting screws during surgery assisted with robotic surgery. The robot can be instructed or otherwise caused to hold and/or guide the path of the screw to match the revised screw plan's output trajectory.

A user, such as a surgeon or surgical staff, can use the revised trajectory plan for inventory planning, because the revised trajectory plan provides estimates of the screw dimensions (e.g., length and width) required for each vertebral level in example implementations. Thus, the user can determine the screws needed for surgeries and order the inventory determined for the procedure. The user may thereby reduce shipping and logistics costs because the user does not need to order unnecessary parts. A user, such as a surgeon, can also use the revised screw trajectory plan as a template screw plan to display or otherwise present to the user and assist and streamline the user's manual planning effort. For example, a surgeon can adjust the revised screw trajectory plan using a displayed screw trajectory during pre-operative planning, and the surgeon can make the adjustments to the revised screw trajectory plan to suit their preferences. An example system for determining pedicle screw trajectories is described in FIG. 1.

FIG. 1 illustrates an example pedicle screw planning system 110 in an operating environment 100. The pedicle screw planning system 110 includes an input device 112 and a display device 114 with one or more displays. In some embodiments, the input device 112 is a keyboard or a touch screen and allows the surgeon to select and manipulate images the display device 114 displays. The one or more displays of the display device 114 can be the touch screens for selecting and manipulating the images the display device 114 displays. The operating environment 100 includes an imaging device 120, a surgical robot 130, a patient P, and a surgeon S. In certain embodiments, the surgeon S uses implants or instruments T at the surgical site during surgery. The imaging device 120 includes a control panel 122 for controlling the imaging device 120 and an imaging system 124 for capturing images (e.g., X-ray images) of the patient at different positions. The imaging system 124 can take any of a variety of forms, such as an X-ray imaging system, a C-arm system, other systems, or combinations thereof. The pedicle screw planning system 110 can communicate with the imaging device 120 to receive images and scans of the surgical site. In some embodiments, the pedicle screw planning system 110 receives images and/or scans, such as from the imaging device 120, before surgery so the pedicle screw planning system 110 can determine a pedicle screw trajectory plan before the surgery. The images can be two dimensional (2D) or 3D images of a spine, such as x-rays, Computed Tomography (CT) scans, Magnetic Resonance Imaging (MRI) images, and the like. When the images are 2D, the pedicle screw planning system 110 uses multiple 2D images to determine a 3D rendering of the imaged spine in example implementations.

In an example, the pedicle screw planning system 110 is in the form of a surgical cart that provides screw planning capabilities. In an example, the surgical cart is a mobile station that includes one or more components that provide functions for use during a surgical procedure. In an example, the surgical cart is as described in US 2022/0296326 (filed 2022 Mar. 7 as application Ser. No. 17/688,574), which is hereby incorporated herein by reference in its entirety for any and all purposes.

In some embodiments, the surgical robot 130 is a robotic system that may assist the surgeon S with surgery. The surgical robot 130 can align screws, align instruments, and/or the like. The pedicle screw planning system 110 can communicate with surgical robot 130, so the surgical robot 130 can assist with the surgery based on the screw trajectory plan the pedicle screw planning system 110 determines.

In certain embodiments, a user, such as a surgeon, uses the input device 112 to cause the pedicle screw planning system 110 to generate pedicle screw trajectory plans and/or cause the pedicle screw planning system 110 to adjust pedicle screw trajectory plans. The surgeon can use the input device 112 to select a technique for pedicle screw trajectory plans to be based on, such as a Magerl technique, a Roy-Camile technique, an Anderson technique, an Ann technique, an anatomical technique, a modified technique, a custom technique based on the surgeon's S previous surgeries, and/or the like. Based on the technique the pedicle screw planning system 110 is using (e.g., receiving a choice of a technique via input from the surgeon S), the pedicle screw planning system 110 selects weights to assign to the factors. The pedicle screw planning system 110 uses the weighted factors to determine the pedicle screw trajectories in example implementations. In some embodiments, the surgeon S selects a section of the spine that the surgeon will perform surgery on using the input device 112. For example, the pedicle screw planning system 110 determines one or more vertebral levels (e.g., receiving a selection of vertebral levels via input from the surgeon S) and/or selects one or more vertebra associated with a surgery. The pedicle screw planning system 110 determines the screw trajectory plan for the selected area in response to the surgeon's S input.

The surgeon S can view a surgical image of the patient P with rendered screw trajectories on the display device 114 based on a screw trajectory plan the pedicle screw planning system 110 determines. The pedicle screw planning system 110 can also render the instrument T on the display device 114. In some embodiments, the surgical robot 130 receives the screw trajectory plan from the pedicle screw planning system 110 and assists the surgeon S with the surgery. For example, the surgical robot 130 uses the screw trajectory plan to position a robotic component to align screws according to the plan, and the surgeon S can implant the aligned screws.

In an example, the pedicle screw planning system 110 is a system that is remote to systems used in an operating room (e.g., one or more components of the pedicle screw planning system 110 are disposed at one or more remote servers). The pedicle screw planning system 110 can communicate with systems in the operating environment 100, such as the imaging device 120 and the surgical robot 130, over a network. In some embodiments, the pedicle screw planning system 110 also communicates with devices that the surgeon S uses for surgical navigation, including for displaying screw trajectories based on a screw trajectory plan determined by the pedicle screw planning system 110. The surgeon S can use the devices in the operating room to communicate with the pedicle screw planning system 110 to cause the pedicle screw planning system 110 to generate pedicle screw trajectory plans and/or cause the pedicle screw planning system 110 to adjust pedicle screw trajectory plans. Thus, the pedicle screw planning system 110 can determine pedicle screw plans for multiple devices used by surgeons in different operating rooms.

Figure 2:
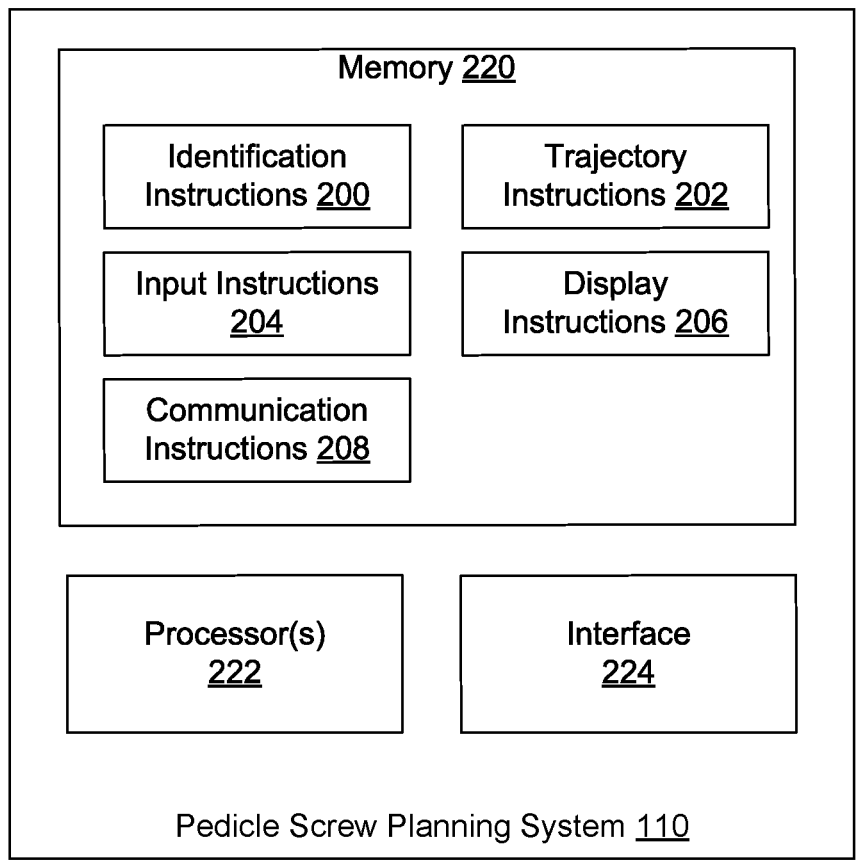
FIG. 2 illustrates the example pedicle screw planning system.

FIG. 2 illustrates the example pedicle screw planning system 110. The pedicle screw planning system 110 includes a memory 220, one or more processors 222, and one or more interfaces 224.

The memory 220 is one or more physical or virtual components configured to store information, such as data or instructions. In some examples, the memory 220 includes a computing environment's main memory (e.g., random access memory) or long-term storage memory (e.g., a solid state drive). The memory can be transitory or non-transitory computer-readable or processor-readable storage media. The memory 220 can include read only or read-write memory.

The one or more processors 222 are one or more physical or virtual components configured to obtain and execute instructions. In many examples, the one or more processors 222 are central processing units, but can take other forms such as microcontrollers, microprocessors, field programmable gate arrays, graphics processing units, tensor processing units, other processors, or combinations thereof.

The interface 224 is a set of one or more components by which input can be received and output can be provide. For example, the interface 224 can include one or more user input components, such as one or more sensors, buttons, pointers, keyboards, mice, gesture controls, touch controls (e.g., touch-sensitive strips or touch screens), eye trackers, voice recognition controls (e.g., microphones coupled to appropriate natural language processing components), other user input components, or combinations thereof. The interface 224 can include one or more user output components, such as one or more lights, displays, speakers, haptic feedback components, other user output components, or combinations thereof. The interface 224 can further include one or more components configured to provide output to or receive input from other devices (e.g., implanted or external devices), such as one or more ports (e.g., USB ports, THUNDERBOLT ports, serial ports, parallel ports, Ethernet ports) or wireless communication components (e.g., components configured to communicate according to one or more radiofrequency protocols, such as WI-FI, BLUETOOTH, ZIGBEE, or other protocols).

As illustrated, the memory 220 includes identification instructions 200, trajectory instructions 202, input instructions 204, display instructions 206, communication instructions 208.

The pedicle screw planning system 110 can communicate with other devices (e.g., the imaging device 120 and the surgical robot 130) using the communication instructions 208. For example, the pedicle screw planning system 110 receives pre-operative and/or intra-operative images of a spine using the communication instructions 208.

The identification instructions 200 are instructions that, when executed by the one or more processors 222 cause the one or more processors 222 to identify positions of one or more vertebrae and components of the one or more vertebrae in images. The identification instructions 200 can operate to use a machine learning model, such as the vertebral segmentation DNN described in PCT application WO2021061878A1, to determine the positions of the vertebra and the components of the vertebra or characteristics of the patient's spine. In addition or instead, the identification instructions 200 can cause the one or more processors 222 to receive manual annotations.

The trajectory instructions 202 are instructions that, when executed by the one or more processors 222 that, when executed by the one or more processors 222, cause the one or more processors 222 to determine initial pedicle screw trajectory plans and/or revised pedicle screw trajectory plans. The trajectory instructions 202 can operate to use a machine learning algorithm to determine the screw trajectory plans. In some embodiments, the screw trajectory planning algorithm uses weights associated with techniques stored in the memory 220, determines weights based on techniques, and/or determines weights associated with a surgeon's technique, using scans of the surgeon's previous surgeries for example. The trajectory instructions 202 can operate to use an atlas technique and/or a machine learning model to determine an initial pedicle screw trajectory plan.

The display instructions 206 are instructions that, when executed by the one or more processors 222, cause the one or more processors to provide a user interface at the display device 114. For example, the display instructions 206 can operate to provide a user interface that displays the initial pedicle screw trajectory plan. In certain embodiments, the display instructions 206 are configured to receive user input that changes the initial pedicle screw trajectory plan.

The communication instructions 208 are instructions that, when executed by the one or more processors 222, cause the pedicle screw planning system 110 to communicate with one or more other devices (e.g., using the interface 224). For example, the communication instructions 208 can operate to send the initial pedicle screw trajectory plan to another device for a user to view and alter.

The operations performed by the trajectory instructions 202 or other aspects described herein can be described using various symbols or variables, including those described in Table 1 below.

TABLE 1

| Symbol | Meaning |
|---|---|
| $\varphi$ | Hyperparameter |
| $\lambda$ | Weight |
| $\Omega$ | Constraint |
| Descriptor(entry) | Shape of anatomy at the entry location |
| $\varphi_{Cranial}$ | Cranial angle hyperparameter |
| angle$_{Cranial}$ | Cranial angle |
| $\varphi_{Medial}$ | Medial angle hyperparameter |
| angle$_{Medial}$ | Medial angle |
| $\varphi_{Channel}$ | Channel angle hyperparameter |
| angle$_{Channel}$ | Channel angle |
| $\varphi_{Entry}$ | Entry angle hyperparameter |
| entry | Entry position |
| entry$_x$ | Entry position on x-axis |
| entry$_y$ | Entry position on y-axis |
| entry$_z$ | Entry position on z-axis |
| Length(screw) | Screw length |
| Width(screw) | Screw width |
| Screw$^{init}_x$ | Initial screw position on x-axis |
| Screw$^{init}_y$ | Initial screw position on y-axis |
| Screw$^{init}_z$ | Initial screw position on z-axis |

In this example, the hyperparameters can be values used in the process that are not going to be output by the algorithm (e.g., a parameter that is a factor but is not tuned by the process). By contrast, parameters can be values to be determined by an algorithm or process. Parameters can physically describe a screw plan (e.g. a length, width, orientation, and entry position). Constraints can be defined as inviolable rules imposed on the allowed values of parameters. Hyperparameters can be settings, algorithm choices, or other properties of the algorithm itself that control the optimization process and/or how the parameters are updated over successive iterations.

The cost function can enable comparing the value of different screw plans (either using each candidate plan's set of parameters, or information derived from the parameters). The cost function can allow optimizing one or more objectives (e.g. maximizing the length, width or entry point stability, or minimizing number of breaches, difference with an preferred angle or invasiveness, etc., or any combination thereof) together (e.g. using a weighted sum of factors) or independently (e.g. computing the Pareto front).

The Descriptor(entry) can be or can include surface and/or shape descriptors of the anatomical area of the screw entry location. In an example, the descriptor can be a geometric property of a 3D surface that provides a scalar value for representative points (or every point) on the surface mesh. The Descriptor(entry) belongs to the field of study of shape analysis. Different surface descriptors encode different information about the given geometric 3D object. For example, the curvature of a 3D mesh can be computed to distinguish flat regions from curved regions.

The trajectory instructions 202 can operate to use an optimization cost function with factors and/or weights assigned to the factors to determine a revised pedicle screw trajectory plan. In general, the result of the function can be used to determine the desirability of a set of parameters for placement of a screw. For instance, any of a variety of different numerical optimization algorithms can be used to determine parameters for a trajectory while maximizing or minimizing the value of the optimization function (e.g., maximizing or minimizing as appropriate based on whether the optimization function represents a costs or a goodness of the parameters being optimized). Example optimization algorithms include hill climbing algorithms, gradient descent, simulated annealing algorithms, genetic algorithms, other algorithms, or combinations thereof.

One factor in the optimization cost function can be the surface or shape descriptor. Various surfaces or shapes of the anatomy at the entry point of a screw can affect desirability of the resulting screw plan. For instance, certain entry locations can increase or decrease the likelihood of skiving. The desirability can be directly encoded into the descriptor for the entry or it can be determined from a function configured to determine desirability (e.g., based on a likelihood of skiving). Various factors can be the difference between the resulting parameter and an hyperparameter. For instance, the hyperparameter can be an idealized parameter (e.g., an idealized screw angle that is cranial, medial, etc.) and the equation can take into account how far the parameter is from the idealized screw angle. The idealized hyperparameter can be predetermined based on a chosen technique (e.g., Magerl, etc.), based on surgeon preferences, based on other factors, or combinations thereof. In many examples, it is impossible to have each of the parameters match an idealized parameter, so tradeoffs may need to be made. While other examples are possible, one implementation of an optimization cost function can be equation 1 below.

$$L(\text{screw} \mid \varphi, \lambda, \Omega) = \lambda_{Descriptor} \text{ Descriptor(entry)} +$$
$$\lambda_{cranial}(\varphi_{Cranial} - \text{angle}_{Cranial}) + \lambda_{Medial}(\varphi_{Medial} - \text{angle}_{Medial}) +$$
$$\lambda_{channel}(\varphi_{Channel} - \text{angle}) + \lambda_{Entry}(\varphi_{Entry} - \text{entry}) +$$
$$\lambda_{length-screw}(\varphi_{Length} - \text{Length(screw)}) + \lambda_{width-screw}(\varphi_{Width} - \text{Width(screw)})$$

In the specific example equation above, the function can be based on a weighted desirability of the descriptor(entry), the weighted difference between an idealized cranial angle hyperparameter and the determined cranial angle parameter, the weighted difference between an idealized medial angle hyperparameter and the determined medial angle parameter, the weighted difference between an idealized channel angle hyperparameter and the determined channel angle parameter, the weighted difference between an idealized entry hyperparameter and the determined entry parameter, the weighted difference between an idealized screw length hyperparameter and the determined screw length, and the weighted difference between an idealized screw width hyperparameter and the determined screw width.

Other factors can also be taken into account to produce the trajectory. In an example, bone type (e.g., cortical or cancellous) and/or bone density is taken into account. For example, trajectories that go through denser bone are weighed more favorably than trajectories that go through less dense bone.

The trajectory instructions 202 can assign each of the different kinds of weights λ based on a technique and/or based on a surgeon's previous surgeries and/or preferences. In some examples, the trajectory the algorithm can be run forwards or backwards. You can adjust weights to determine a screw trajectory plan or you can take a screw trajectory plan and calculate the weights needed to recreate that plan. The bone density can be determine through segmenting or otherwise analyzing various types of imaging, such as pre-op CT scans.

The channel angle can be a variable that describes a pedicle channel of a vertebra. The channel angle can be defined based on both a cranial-caudal angle of the channel and a medial-lateral angle. Thus, the channel can be defined in a 3D space. The angle of the channel can be defined as a set of two values: the cranial angle and medial angle. The reference (0°) cranial angle can be defined as being parallel with the vertebral body superior endplate. The reference) (0°) medial angle can be defined as being parallel with the vertebral midline (drawn between the tip of the spinous process and the vertebra body's center of mass).

The entry position can be the position in three-dimensional space. The entry position can therefore be described with x, y, and z coordinates.

The trajectory instructions 202 can operate to define or load the constraints. The constraints can be hyperparameters. Example constraints include maximum and minimum values for each of: cranial angle, medial angle, entry angle, z position, y position, and x position. Other constraints can be specified, such as constraints for screw length and diameter (e.g., to constrain to possible inventory values or to avoid breaching the pedicle or an anterior portion of the vertebral body), other constraints, or combinations thereof. There can be further constraints such that the entry point must be located on the vertebra. Table 2 (below) shows example constraint values:

TABLE 2

| Value | Minimum | Maximum |
|---|---|---|
| Bounds$_{Cranial\ angle}$ | 0° | 0° |
| Bounds$_{Medial\ angle}$ | 0° | 45° |
| Bounds$_{entry\ x}$ | midline | Lateral-most point |
| Bounds$_{entry\ y}$ | Posterior most point on vertebra | Anterior most point on vertebra |
| Bounds$_{entry\ z}$ | Inferior most point on vertebra | Superior most point on vertebra |
| X | Screw$^{init}_x$ − 5 mm | Screw$^{init}_x$ + 5 mm |
| Y | Screw$^{init}_y$ − 5 mm | Screw$^{init}_y$ + 5 mm |
| Z | Screw$^{init}_z$ − 5 mm | Screw$^{init}_z$ + 5 mm |

In one example implementation, in the optimization algorithm, the x, y, z constraints relate to the value of the final produced pedicle screw's entry point and constrains it within a radius of 5 mm around the initial pedicle screw's entry point. The assumption is that the initial screw provided to the algorithm is within ~10 mm of the ideal location of the local or global maximum ("best") pedicle screw. Thus, this limits the space of possible screws to search, improving the speed and convergence rate of the algorithm. It can be thought of as the same type of constraint as the one on the cranial/medial angle, but for a 3D point. In some examples, the x, y, and z constraints can be merged with the Bound$_{Sentry\ x/y/z}$ row in the table, or removed completely, since there can be more than one constraint on any given parameter/objective. In other words: it may not even be necessary to mention certain constraints separately because another kind of constraint (e.g., on the entry point) can be described elsewhere in the same table.

Thus, the trajectory instructions 202 can determine the revised trajectory, entry position, screw length, and/or screw width for each screw in the revised screw trajectory plan. In some embodiments, the revised screw trajectory plan includes revised screw trajectories with revised positions and/or revised orientations, revised screw lengths, and/or revised screw widths. Additionally, the revised screw trajectory plan can include a screw inventory that details the amounts of each screw for each length and width needed for the surgery associated with the screw trajectory plan. The surgeon S and/or another user can use the revised screw trajectory plan for manually inserting screws during surgery, for inserting screws during surgery assisted with robotic surgery, for inventory planning, and/or for use as an initial approximate screw plan assisting and/or streamlining a manual planning effort. The screw trajectory planning algorithm can also use the revised trajectory plan to continue to update or otherwise train to better determine the weights based on produced revised screw trajectories.

The display instructions 206 further operates to display surgical images on the display device 114. In an example implementation, the display instructions 206 renders screw trajectories, including entry positions, on the surgical images the display device 114 displays. The display instructions 206 can also render instruments on the surgical images the display device 114 displays.

The input instructions 204 operates to receive inputs, such as inputs received via the input device 112. The input instructions 204 can send the inputs to the identification instructions 200, the trajectory instructions 202, the display instructions 206, and/or the communication instructions 208. For example, the input instructions 204 can operate to receive an input to create a pedicle screw trajectory plan. The input instructions 204 communicates with an imaging device, storage device, and/or the memory 220 to cause the imaging device to capture and send an image of the patient's spine and/or receive an image of the patient's spine. The input instructions 204 can also cause the identification instructions 200 to operate to identify vertebra and/or components of the vertebra in the image associated with the pedicle screw trajectory plan request.

The input instructions 204 can operate to also receive a selection of a technique for the pedicle screw trajectory plan to be based on. The input instructions 204 can send the selection of the technique to the trajectory instructions 202 for the trajectory instructions 202 to operate to assign weights to the factors for determining the screw trajectories, screw lengths, and/or screw widths, using the pedicle screw planning algorithm for example. The input instructions 204 can receive an input to display an image with screw trajectories rendered on the image based on a pedicle screw trajectory plan, and the input instructions 204 can operate to cause the display instructions 206 to display the image and rendered screw trajectories on the display device. The input instructions 204 can also cause the communication instructions 208 to communicate with an external display device to cause the external display device to display the image and rendered screw trajectories.

The memory 220 operates to store predetermined weights associated with pedicle screw insertion techniques, store weights determined for a surgeon's preferences, and/or the like. The trajectory instructions 202 can access the weights from the memory 220. The memory 220 can also store images of spines for the identification instructions 200, the trajectory instructions 202, the display instructions 206, and/or the communication instructions 208 to use.

Figure 3:
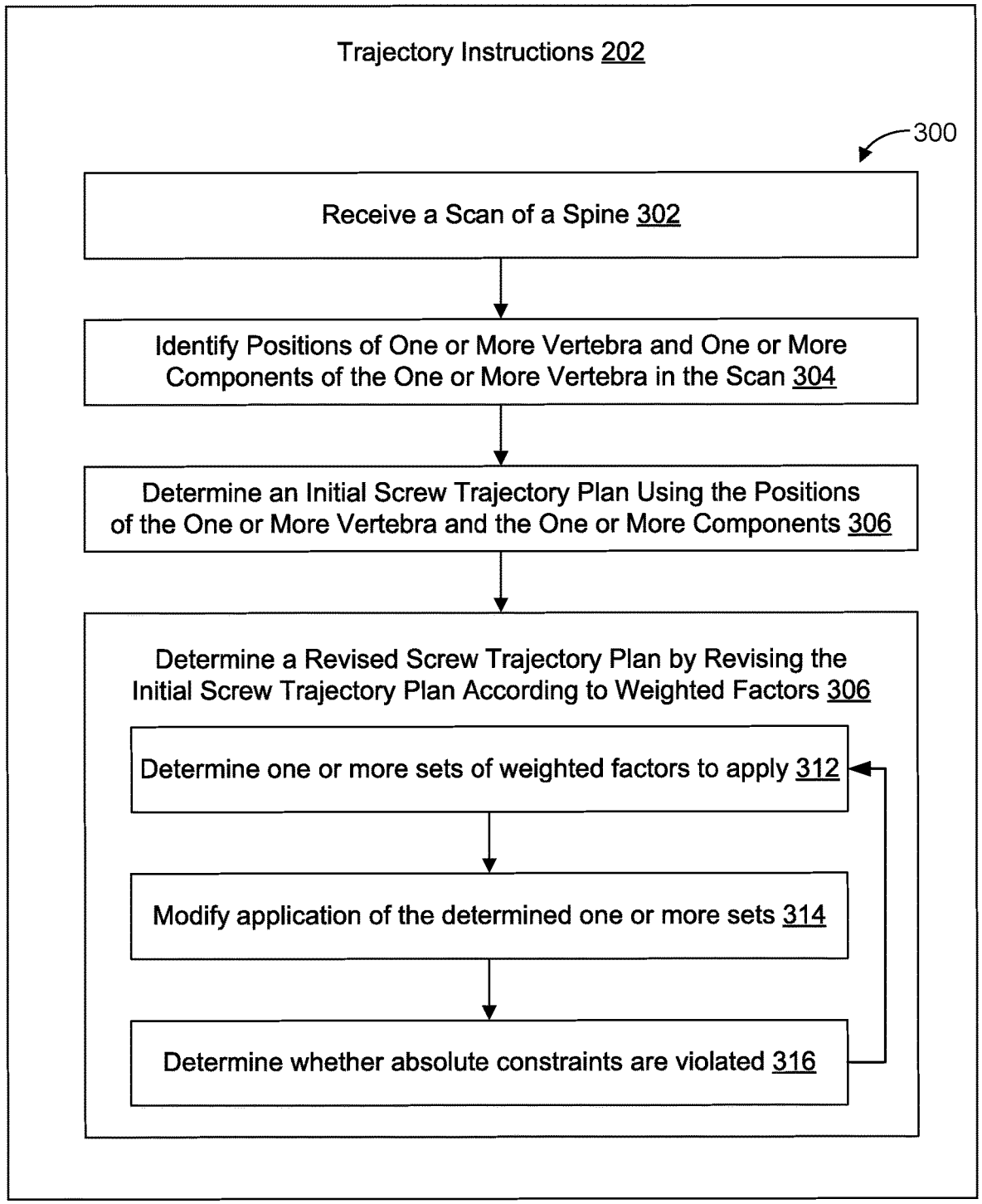
FIG. 3 illustrates an example method for pedicle screw planning.

FIG. 3A illustrates an example method 300 for pedicle screw planning that can be performed by the execution of the trajectory instructions 202. The method 300 begins at operation 302, which includes receiving a scan of a spine. For example, the pedicle screw planning system 110 receives the scan of the spine from an intraoperative or preoperative imaging system. The scan can be a pre-operative or an intra-operative scan of the spine, so the pedicle screw planning system 110 may receive the scan before surgery or during surgery. In an example implementation, the pedicle screw planning system 110 creates a pedicle screw plan using a pre-operative scan and revises the pedicle screw plan using an intra-operative scan. The scan can be a 3D scan of the spine and/or multiple 2D images of the spine. The pedicle screw planning system 110 can determine a 3D model of the spine using the multiple 2D images. In some embodiments, the pedicle screw planning system 110 receives the scan of the spine from an imaging device, such as the imaging device 120. Following operation 302, the flow of the method can move to operation 304.

In operation 304, positions of one or more vertebra and one or more components of the one or more vertebra in the scan of the spine are identified. For example, the pedicle screw planning system 110 determines the positions of the vertebra and/or the components of the vertebra. The components of the vertebra can include endplates, bodies, and pedicles of the vertebra. This operation 304 can include performing segmentation, such as using techniques described elsewhere herein.

The operation 304 can include reconstructing an exterior surface mesh of vertebral segmentation volume and compute its shape descriptor properties. In an example, surface reconstruction is performed, then sagittal hemisphere splitting, and then spectral descriptor analysis. The surface reconstruction can be performed using any of a variety of techniques, such as via isocontouring algorithms (e.g., as described in Schroeder et al, Flying Edges: A High-Performance Scalable Isocontouring Algorithm, 5th IEEE Symposium on Large Data Analysis and Visualization, October 2015). Example spectral descriptors include heat kernel signature, wave kernel signature, spectral graph wavelet signature, global point signature, ShapeDNA, other descriptors, or combinations thereof. In an example, the vertebra is shown having scale invariant heat kernel signature values.

Following operation 304, the flow of the method can move to operation 306.

In operation 306, an initial screw trajectory plan is determined using the positions of the one or more vertebra and the one or more components. For example, the pedicle screw planning system 110 determines the initial screw trajectory plan using any of a variety of techniques. This can include, for example, receiving over a user interface an initial screw plan from a user, receiving the initial screw plan from an atlas-based technique, or receiving the initial screw plan from an artificial-intelligence-based technique, other techniques or combinations thereof.

Various strategies can be used to determine an initial screw trajectory plan. One example includes the use of an atlas technique. Using points identified in an atlas, finding similar key points in a new scan, and then placing the screw in the same relative position. In an example, an ideal trajectory for a given idealized vertebra is determined by morphing fit screw trajectories from many different surgeons on many different vertebra to correspond to a single model vertebra. In an example, the trajectory can be found by determining a trajectory on an average vertebra from many different scans of placed pedicle screws. Mapping of the trajectory to the vertebra can be achieved using a registration technique. For instance, the patient scan reference space can be registered to specific patient space for annotation. An example atlas technique is performed using generalized Procrustes analysis.

Another strategy is a skeleton technique where the morphology of a given vertebra is assessed to identify the likely location of the pedicle channel and a screw trajectory is chosen that passes through that channel. Here, skeleton refers to a topological skeleton of the vertebra. The topological skeleton is then used to find a path through the pedicle. The location of the channel can be identified based on a segmentation algorithm. This technique can choose a screw trajectory that passes through the center of the topological skeleton of the pedicle as close as possible.

Another strategy is the use of machine learning (e.g., a DNN) to identify a center of mass of the pedicle channel and a fixed trajectory is determined that passes through that center of mass. Another strategy uses a determined center of mass of the pedicle channel and then an arbitrary screw trajectory is chosen that passes through that point. In an example, the arbitrary trajectory has some fixed angle relative to the anatomy (e.g., every single scan will get a screw passing through the pedicle center, at a cranial angle of 35 degrees). The trajectory can be based on a simple predetermined constant. In other examples, the trajectory is pseudorandom within a range (e.g., a range based on constraints).

Following operation 306, the flow of the method can move to operation 308.

In operation 308, a revised screw trajectory plan is determined by revising the initial screw trajectory plan according to weighted factors. For example, the pedicle screw planning system 110 determines the revised screw trajectory plan using a pedicle screw-planning algorithm defined by the trajectory instructions 202. In some examples, the revising is performed using an evolutionary algorithm.

Performing operation 308 can include the operations, such as operation 312.

Operation 312 includes determining one or more sets of factors to apply. For example, a set of factors can be associated with modifying a generic trajectory to be a specific trajectory, such as a Roy-Camille trajectory, a Magerl trajectory, and a Krag trajectory, a cortical bone trajectory, a straight medial angle trajectory, a straight cranial angle trajectory, and a downward cranial angle trajectory, a user-defined trajectory, other trajectories, or combinations thereof. For instance, one of the sets of factors can be usable to modify the initial trajectory to be a Roy-Camille trajectory. In some examples, the sets of factors are lookup tables or other data structures that provide the conversion. In other examples, the sets of factors are machine learning or artificial intelligence techniques that apply the correction as output in response to an input that defines the initial trajectory. Further still, examples described herein can be used to produce trajectories following no known technique. Rather, the trajectories can be optimized against user-specified (or automatically determined) constraints, which can result in generating novel screw plans with better properties or tradeoffs compared to predefined screw plans.

The sets of factors can be in any of a variety of different kinds of useful formats. In an example, the factors of a set can a set of constraints that must be complied with to satisfy the set. For instance, the technique embodied by a set of factors requires a particular screw angulation or positioning to achieve. In some examples, the sets of factors can be sets of factors and weights that describe a technique embodied by the set of factors. For instance, the factors can be specific degrees that define a trajectory of a pedicle screw for a particular technique.

The determining of the one or more sets of factors to apply can include the system receiving a user selection of the set to apply. For instance, the system can receive actuation of a user interface element (e.g., a drop down menu) that specifies a factor. In addition or instead, the operation 312 can include determining the set by loading a set from a preferences file. In addition or instead, the operation 312 can include determining the set by algorithmic or artificial intelligent selection based on one or more criteria. For example, certain sets of factors can be associated with particular benefits or risks and the set can be selected to increase one or more benefits while reducing one or more risks. Example criteria affecting risks or benefits include: risk of screw pullout (e.g., which can be an increased or decreased factor based on patient bone density, the nature of the planned spinal construct, other factors, or combinations thereof), ease of screw insertion, margin of error (e.g., which can be an increased or decreased factor depending on insertion technique, such as freehand, navigated, or robotic), risk of skiving (e.g., which can be an increased or decreased factor depending on insertion technique), risk of pedicle breach, nature of the surgery (e.g., spinal fusion or scoliosis correction), construct stability, risk of screw breakage, risk of pedicle fracture, risk of pedicle breach, risk of toggling, other circumstances, or combinations thereof. These criteria can be determined based on AI or manual (e.g., by the user) determination. For example, an AI can analyzed patient imaging or patient records to determine these circumstances (e.g., the risk thereof) and facilitate selection of one or more sets of weighted factors to apply in view of such circumstances.

Following operation 312, the flow of the method can move to operation 314.

Operation 314 includes modifying the application of the determined one or more sets. In an example, there may be one or more different ways to apply the set of one or more factors. For instance, there may be multiple different trajectories that satisfy constraints defined by the set. Further, the user may want to modify the trajectory in a way that nonetheless violates the constraints. In another example, the set may define a specific trajectory that can nonetheless be modified. The modification can be performed using any of a variety of techniques, such as by applying one or more constraint satisfaction algorithms or problem solvers.

In one example, the operation 314 includes using an evolutionary algorithm. The evolutionary algorithm can be configured to find a pedicle screw and trajectory that maximizes the dimensions of the pedicle screw and trajectory while minimizing morphological constraints. The inputs to the algorithm can include information determined from prior steps. Example inputs include a vertebral surface, vertebral orientation, the pedicle screw channel's center of mass, hyperparameters, other inputs, or combinations thereof. The evolutionary algorithm can include various operations, such as initialization operations, simulation operations, evolution algorithms, other operations, or combinations thereof.

An example implementation of an evolutionary algorithm is:

---

Input: vertebra surface v, vertebra orientation o, pedicle channel center of mass p, hyperparameters $\phi$.
Output: one or more Pareto optimal pedicle screws $Y_{Pareto}[i]$.
Optimize(v, o, p)
    1        for each i $\in$ [$\phi_P$]
    2            y $\leftarrow$ initialize(p, $\phi_C$, $\phi_M$)
    3            $Y_0[i]$ $\leftarrow$ simulate(y, v, o)

-continued

```
4         for each g ∈ [φ_G]
5           for each y ∈ Y_{g-1}
6             x ← U(0, 1)
7             if x < φ_π
8               y ← evolve(y, φ_Δe, φ_Δc, φ_Δm)
9               y ← simulate(y, v, o)
10            Y_g[i] ← y
11          Y_g ← sort(Y_g ⌣ Y_{g-1}, φ_P)
12        Y_Pareto ← P(Y_g)
13      return Y_Pareto
```

The initialization algorithm can be configured in any of a variety of ways, such as:

```
Input: 3D coordinates p, a pair of cranial lower and upper bounds
C, a pair of cranial lower and upper bounds M.
Output: a random screw parameters representation σ, with its
position fixed and its trajectory randomly sampled.
Initialize(p, C_{Lower, upper}, M_{Lower, upper})
1         σ_e ← p
2         σ_c ← U(C_Lower, C_upper)
3         σ_m ← U(M_Lower, M_upper)
4       return σ
```

The evolve function can be configured in any of a variety of ways. In an example, the inputs include σ, Δe, Δc, and Δm. The evolve function can modify a candidate screw, including mutation, crossover, etc. For example, randomly mutate the current parameter $\sigma_e$, $\sigma_c$ or $\sigma_m$ of y with a magnitude sampled from a normal distribution with standard deviation Δe, Δc or Δm respectively. This can return a modified screw y(σ).

The simulate function can be configured in any of a variety of ways. In an example, the simulate function takes y, v, and o as input. This can simulate a pedicle screw given its parameters y(σ). This process computes the longest and widest possible screw that fits inside vertebra v subject to the following physical constraints: not breaching/intersecting the surface v, not crossing the midline given by $o_{sagittal}$. This process also computes the surface descriptor value at the position of its entry point. It returns a modified screw y(σ, ζ) with new properties ζ. length, width and descriptor value.

The sort function can implement any of a variety of sorting genetic algorithms. It can be configured to sort the elements y∈Y into multi-objective Pareto fronts, returning the top n best elements. This can be the loss function of the evolutionary algorithm since it provides a way of ranking different candidate screws. In an example, the sorting algorithm is the non-dominated sorting genetic algorithm II described by Deb et. al in "A fast and elitist multiobjective genetic algorithm: NSGA-II", IEEE Transactions on Evolutionary Computation (Vol. 6, Issue 2, April 2002). In another example, the function can take other forms, such as single/multi/weighted-sum objectives using tournament selection, roulette selection, NSGA I/II/III, SPEA I/II, other functions, or combinations thereof.

The function P(Y) can be configured to select the Pareto optimal subset of Y given objectives $o_1, o_2, \ldots, o_k$, which corresponds to the first Pareto front of the sort function (e.g., the NSGA-II algorithm).

The function U(lower, upper) can uniformly random sample a real number between lower and upper inclusive bounds.

The notation [N] can refer to a sorted set of integers n={1, 2, . . . , N}.

The notation X ⌣ Y can refer to the concatenation of sets X and Y together.

The variables y, y(σ), y(σ, ζ) can represent a pedicle screw at different stages of optimization. The pedicle screw can be minimally represented by a model with parameters σ. Through a simulation step, a screw can be augmented with physical properties ζ. The screw can be re-simulated any time its parameters change.

The variable σ (e.g., which can include $\sigma_e$, $\sigma_c$, and $\sigma_m$) can correspond to parameters of a pedicle screw used by the evolutionary algorithm operators to generate new candidate screw solutions. The variables can include the screw's position e={x, y, z}, cranial (polar or elevation) angle c, and medial (azimuthal or yaw) angle m.

The variable § (e.g., which can include $\zeta_{length}$, $\zeta_{width}$, $\zeta_{descriptor}$) can describe physical properties of a pedicle screw in 3D space used as objectives of the loss function (e.g., NSGA-II). This can include its cylindrical length and width, as well as the surface descriptor value at its entry point on the vertebra's surface.

The variable φ (e.g., which can include $\phi_P$, $\phi_G$, $\phi_C$, $\phi_M$, $\phi_\Pi$, $\phi_{\Delta e}$, $\phi_{\Delta c}$, $\phi_{\Delta m}$, . . . ) can be hyperparameters of the evolutionary algorithm: the size (P) of the population of candidate screws; the number of generations (G) to run the optimizer; the lower and upper bounds of the initial screw cranial (C) and medial (M) angle to sample from; the probability (Π) for each candidate screw to undergo an evolution event; the standard deviation of the entry point (Δe), cranial (Δc) and medial (Δm) angle shift during an evolution event. Other hyperparameters omitted for brevity (simulation algorithm, breaching constraints, individual probabilities for evolutionary operators, alternative shape descriptor, etc.).

The above is just one example evolutionary algorithm and configuration. Other algorithms (evolutionary or otherwise) can be used.

Operation 316 includes determining whether absolute constraints are violated by the trajectory defined by operation 314. For example, absolute constraints can include breaching the pedicle, breaching the vertebral body, sticking out too much, entering no-go areas, other constraints, or combinations thereof. If the constraints are violated, the flow of the method can move to operation 312 or operation 314.

If constraints are not violated (or the user acknowledges that they nonetheless want to use a trajectory), then the operation 306 can complete and the trajectory can be used in a surgery. In some examples, the trajectory (or components thereof, such as weights) can be stored or provided to another system for future use. For example, the information regarding the trajectory (and other information, such as anatomical information) can be used to adjust machine learning weights or as training data for machine learning based systems. Such adjustment of machine learning weights can be done online (e.g., tweaking weights as the product is used to customize the product for the user) or offline (e.g., tweaking the machine learning weights later for next-generation versions).

Figure 4:
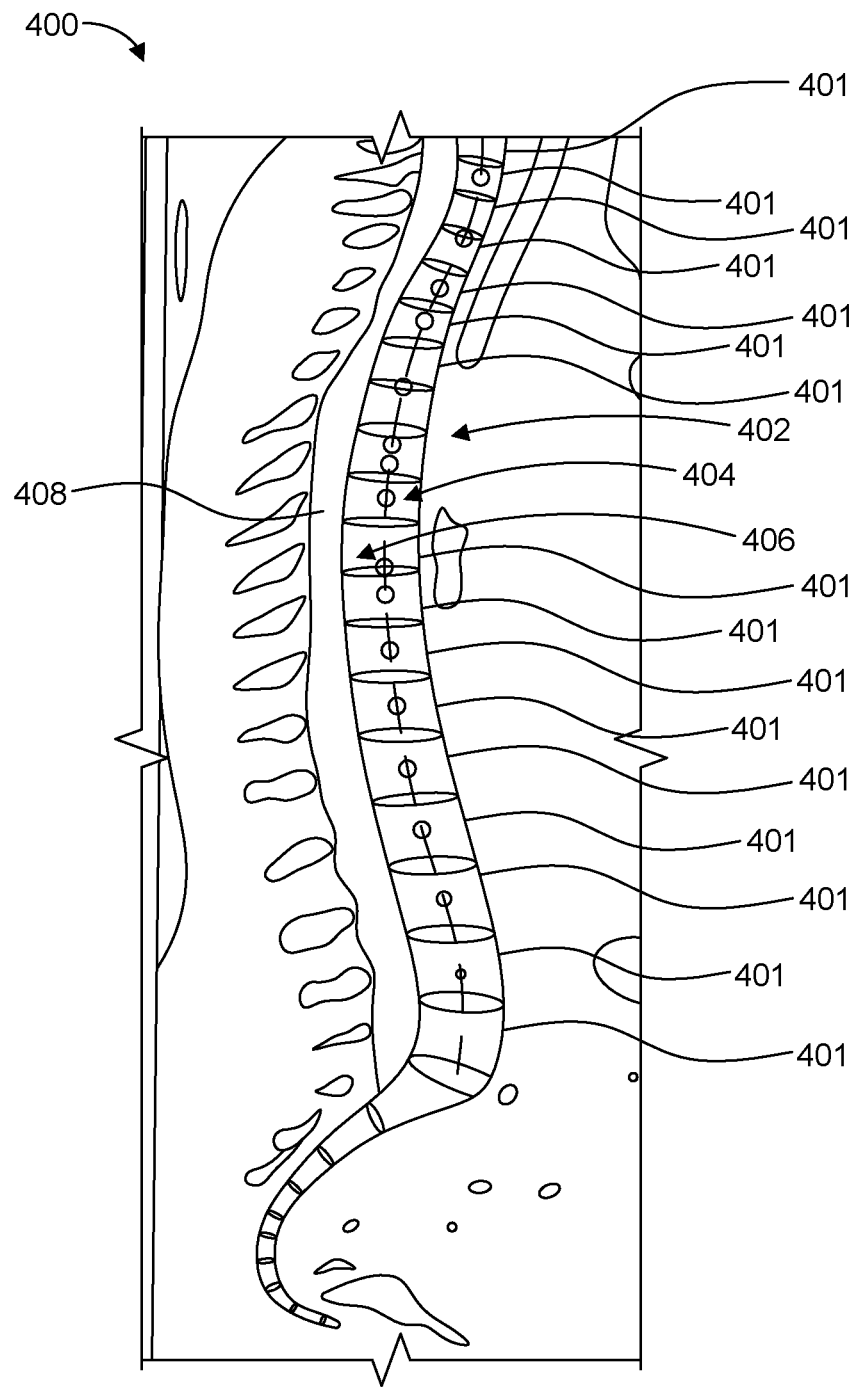
FIG. 4 illustrates an example surgical scan.

FIG. 4 illustrates an example surgical scan 400. The pedicle screw planning system 110 operates to determine the positions of the vertebra 401 and the components of the vertebra 401. For example, the pedicle screw planning system 110 can operate to determine a first anterior plane 402, a centerline 404, a second anterior plane 406, and/or a posterior plane 408. The pedicle screw planning system 110 can use a neural network model to determine the positions of the vertebra 401 and/or the components of the vertebra 401. The neural network model can determine the first anterior plane 402, the centerline 404 the second anterior plane 406, and/or the posterior line plane and/or detect positions the vertebra 401 using morphology information of the vertebra 401 and the first anterior plane 402, the centerline 404, the second anterior plane 406, and/or the posterior plane 408. In this example, planes are used to describe the shape because the surgical scan 400 is three-dimensional. Were the shape be reduced to a two dimensional shape, the planes can instead be in the form of lines.

Figure 5:
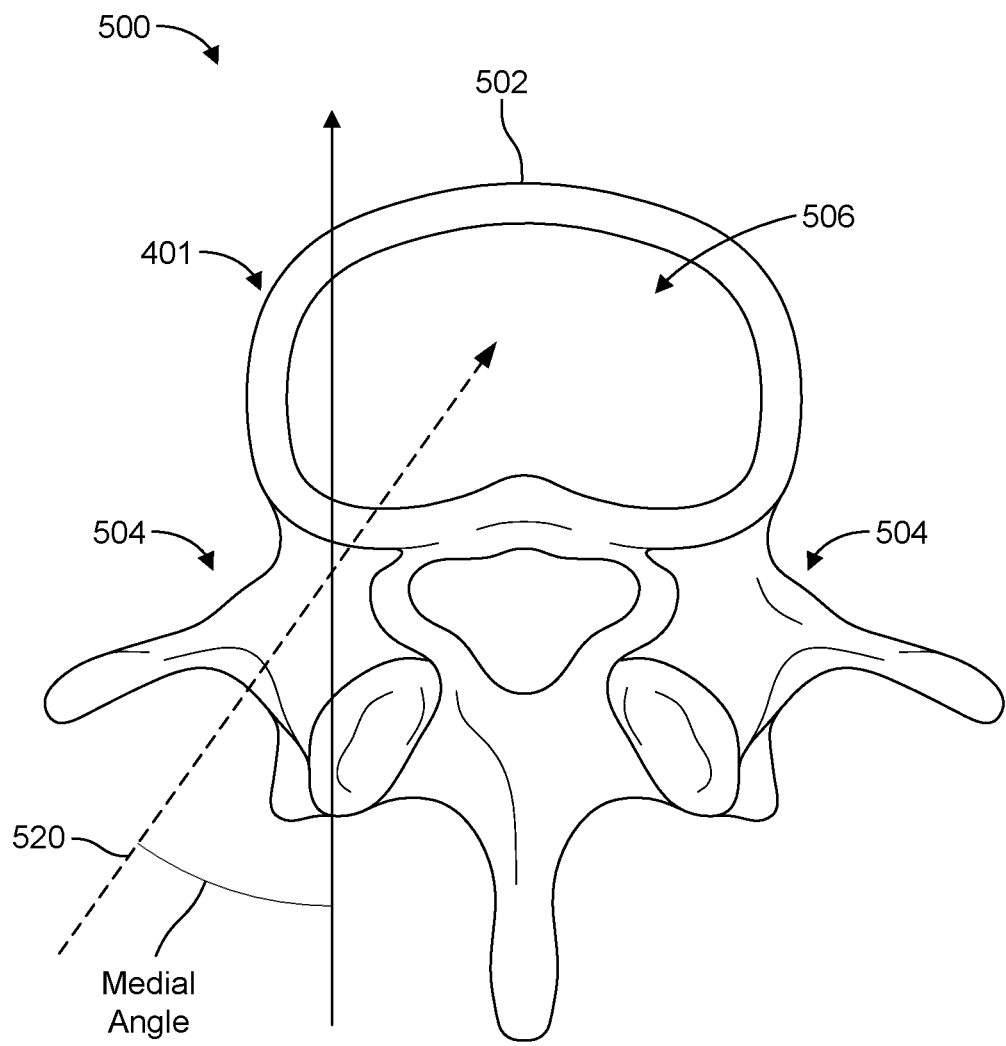
FIG. 5 illustrates an axial view of an example vertebra.

FIG. 5 illustrates an axial view 500 of the vertebra 401 in the form of a slice (e.g., a 2D image) taken out of a 3D scan. The vertebra 401 can be one of the vertebra 401 included in the surgical scan 400. In some embodiments, the pedicle screw planning system 110 determines the position of the components of the vertebra 401. For example, the pedicle screw planning system 110 receives a scan that includes the axial view 500, and the pedicle screw planning system 110 uses the axial view 500 to determine the positions of the components of the vertebra 401. In an alternative implementation, a full 3D image (e.g., rather than just a slice) is used to determine the positions of components of the vertebra and then a slice is shown to the user, because such a 2D representation may be easier to understand than trying to render a screw inside a 3D volume. The components can include a vertebral body 502, pedicles 504, endplates 506, and other components (e.g., laminae, facets, etc.). The pedicle screw planning system 110 can determine a medial angle trajectory line 520 for a pedicle screw for the vertebra 401. The medial angle trajectory line 520 is at a medial angle 522 relative to a medial reference line 524. The medial angle trajectory line 520 can be an angle between the screw and vertebral midline (or any line parallel to it) in the axial view.

The pedicle screw planning system 110 also displays the axial view 500 in some embodiments. For example, the pedicle screw planning system 110 displays the axial view 500 on the display device 114. In example implementations, the pedicle screw planning system 110 renders positions of the components and/or the medial angle trajectory line 520 on the displayed axial view 500 of the vertebra 401.

Figure 6:
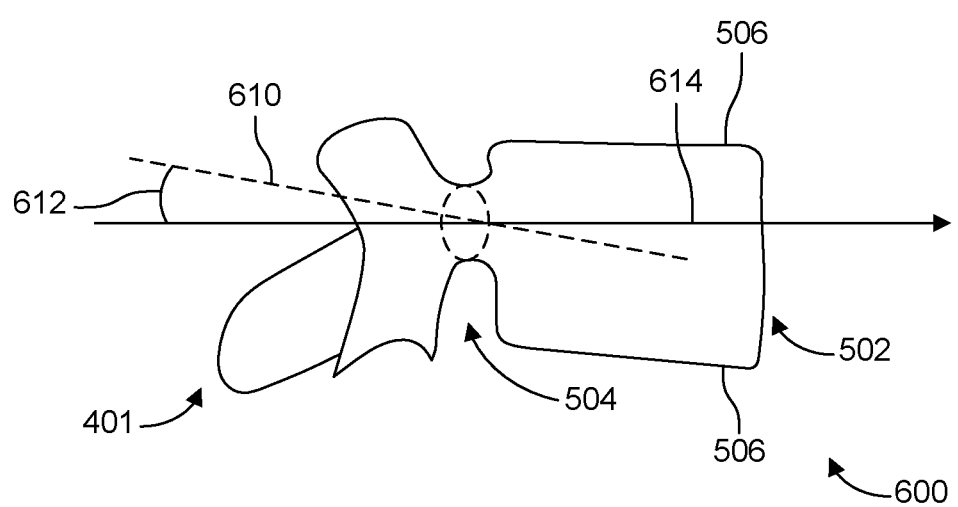
FIG. 6 illustrates a lateral view of an example vertebra.

FIG. 6 illustrates a lateral view 600 of the vertebra 401. The pedicle screw planning system 110 can determine the position of the endplates 506. For example, the pedicle screw planning system 110 receives a scan that includes the lateral view 600, and the pedicle screw planning system 110 uses the lateral view 600 to determine the positions of the components of the vertebra 401, such as the endplates 602. The pedicle screw planning system 110 can also operate to determine a cranial angle trajectory line 610 for a pedicle screw for the vertebra 401 in accordance with an example use case. The cranial angle trajectory line 610 is at a cranial angle 612 relative to a cranial reference plane 614.

The pedicle screw planning system 110 also displays the lateral view 600 in some embodiments. For example, the pedicle screw planning system 110 displays the lateral view 600 on the display device 114. In example implementations, the pedicle screw planning system 110 renders positions of the components and/or the cranial angle trajectory line 610 on the displayed lateral view 600 of the vertebra 401.

Figure 7:
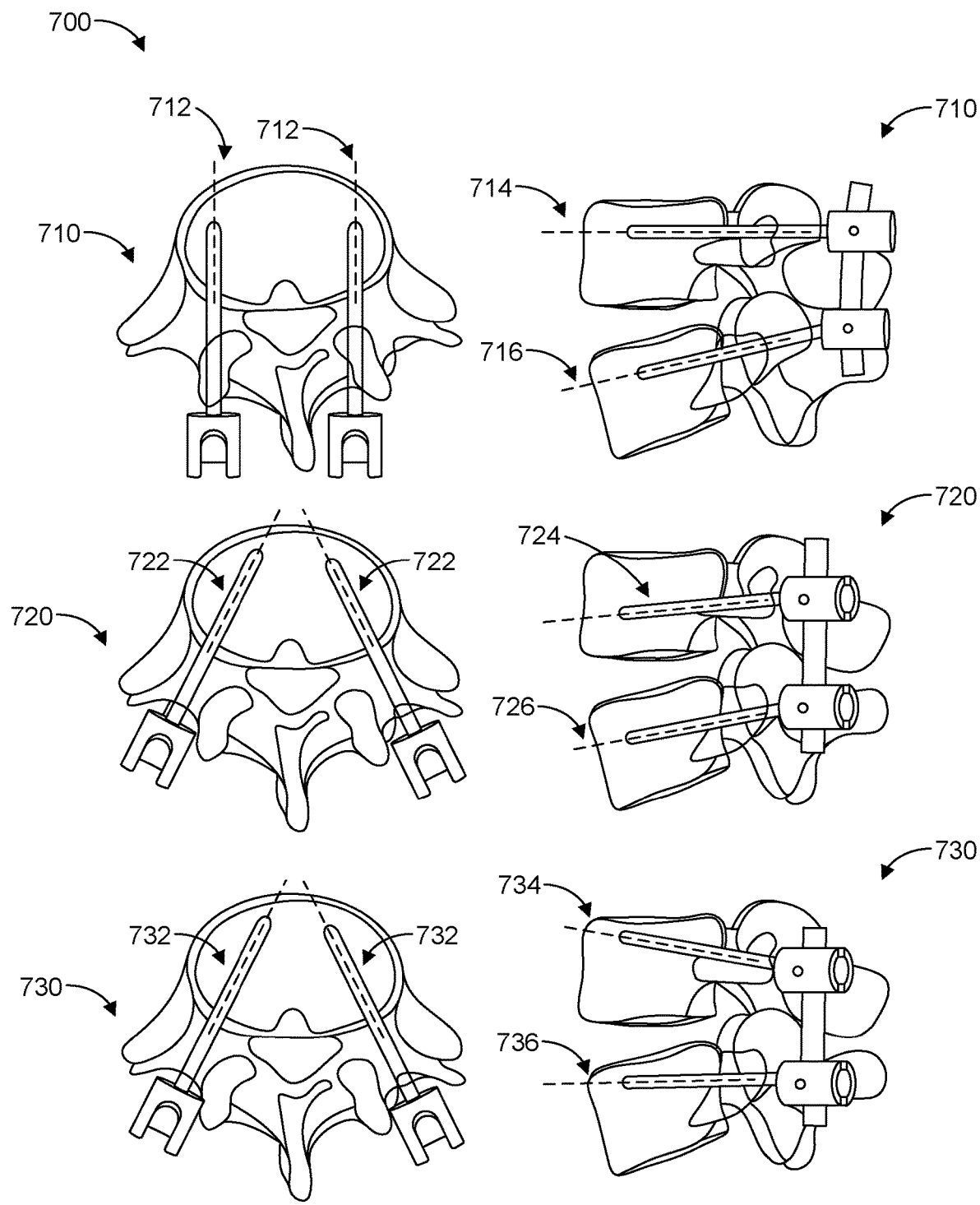
FIG. 7 illustrates example screw trajectories based on example techniques.

FIG. 7 illustrates example screw trajectories 700 based on example techniques. The screw trajectories 700 include trajectories for pedicle screw trajectory plans the pedicle screw planning system 110 creates, such as a Roy-Camille trajectory 710, a Magerl trajectory 720, and a Krag trajectory 730. The pedicle screw planning system 110 can create the Roy-Camille trajectory 710 using weights based on the Roy-Camille technique. The Roy-Camille trajectory 710 includes a straight medial angle trajectory 712, a straight cranial angle trajectory 714, and a downward cranial angle trajectory 716.

The pedicle screw planning system 110 can create the Magerl trajectory 720 using weights based on the Magerl technique. The Magerl trajectory 720 includes angled medial angle trajectories 722, a downward cranial angle trajectory 724, and a downward cranial angle trajectory 726. The pedicle screw planning system 110 can create the Krag trajectory 730 using weights based on the Krag technique. The Krag trajectory 730 includes angled medial angle trajectories 732, an upward cranial angle trajectory 734, and a straight cranial angle trajectory 736.

Figure 8:
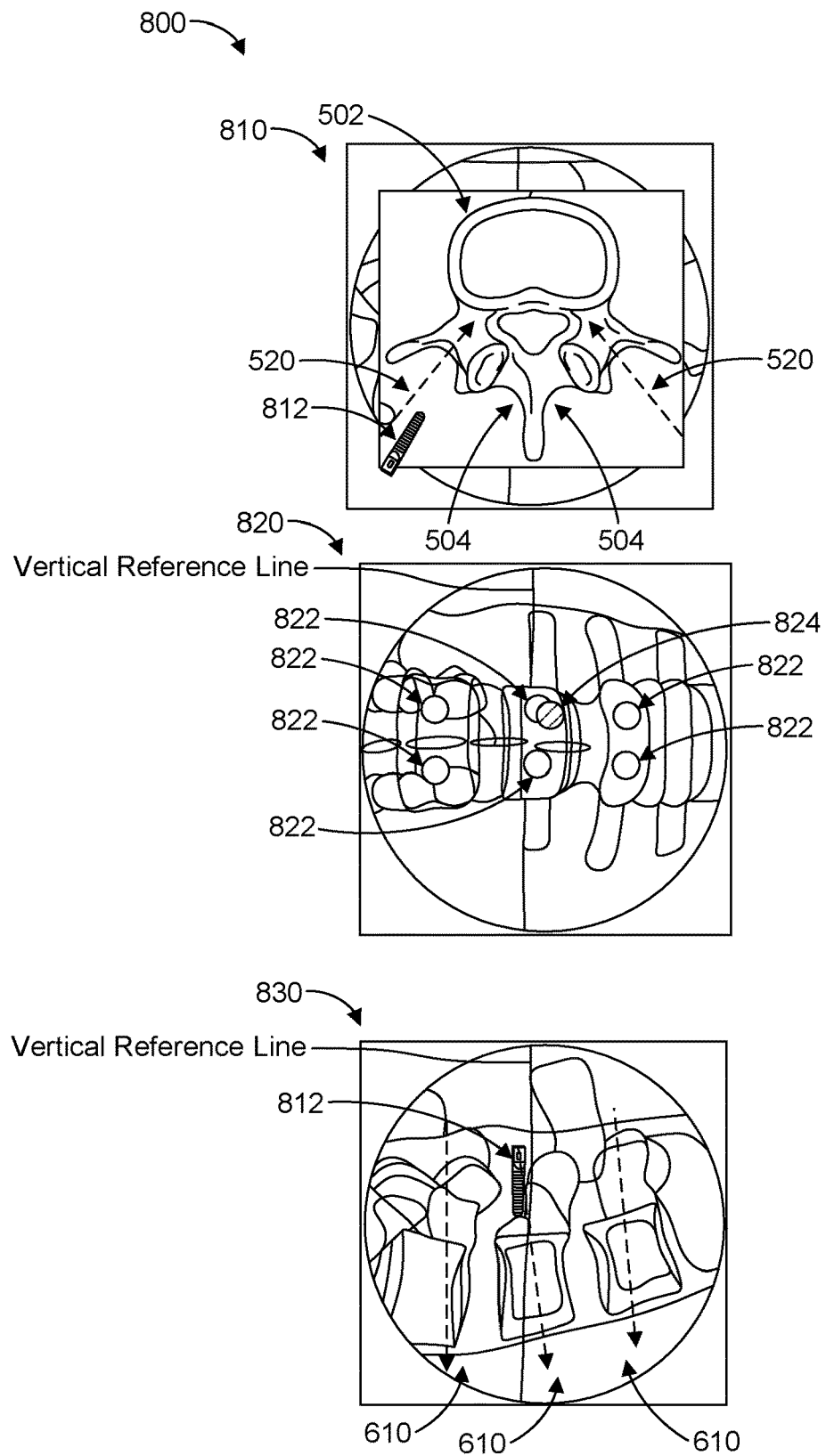
FIG. 8 illustrates example surgical images and rendered screw trajectories.

FIG. 8 illustrates example surgical images 800 and rendered screw trajectories. The surgical images 800 include an axial view 810, an anterior/posterior view 820, and a lateral view 830. The pedicle screw planning system 110 can display the surgical images 800 the display device 114. A user, such as the surgeon S, can use the input device 112 to change the views. For example, the surgeon S uses the input device 112 to cause the pedicle screw planning system 110 to display an aerial view of another vertebra.

The axial view 810 includes medial angle trajectory lines 520 of the displayed vertebra and a rendered screw 812. The medial angle trajectory lines 520 can be the medial angles the pedicle screw planning system 110 determines for the displayed vertebra. The medial angle trajectory lines 520 can be rendered based on the revised screw trajectory plan the pedicle screw planning system 110 determines. In an example implementation, the rendered screw 812 are based on the current position of a screw and/or instrument the surgeon S is using. Thus, the surgeon can use the surgical images 800 to align the rendered screw 812 with one of the medial angle trajectory lines 520.

The anterior/posterior view 820 includes screw positions 822 for the vertebra and a current screw position 824. The pedicle screw planning system 110 operates to determine the screw positions 822 as part of the revised screw trajectory plan, and the pedicle screw planning system 110 can cause the screw positions 822 to be rendered on the anterior/posterior view 820. The current screw position 824 is the current position of a screw, such as the rendered screw 812. Therefore, the surgeon S can use the current screw position 824 to align a screw with one of the screw positions 822.

The lateral view 830 includes cranial angle trajectory lines 610 of the displayed vertebra and a rendered screw 812. The cranial angle trajectory lines 610 can be the cranial angles the pedicle screw planning system 110 determines for the respective vertebra. The cranial angle trajectory lines 610 are rendered based on the revised screw trajectory plan the pedicle screw planning system 110 determines. The rendered screw 812 can be based on the current position of a screw and/or instrument the surgeon S is using. Thus, the surgeon can use the surgical images 800 to align the rendered screw 812 with one of the cranial angle trajectory lines 610.

Figure 9:
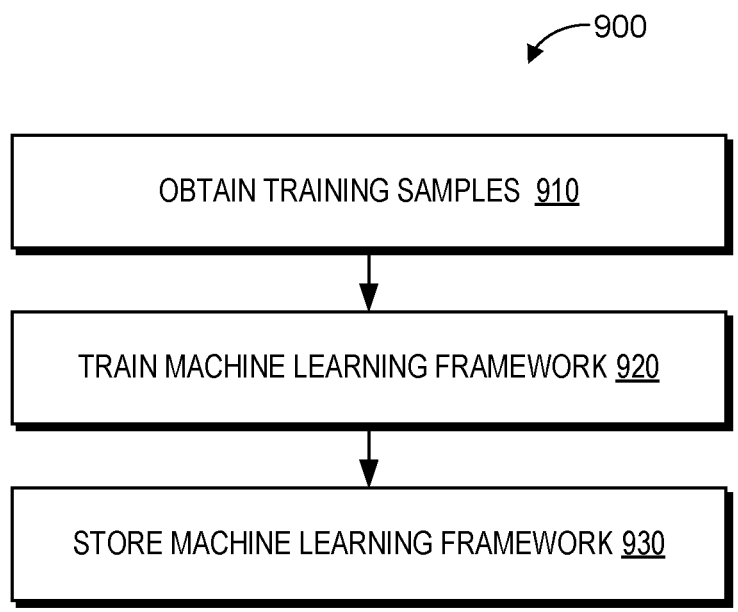
FIG. 9 illustrates an example machine learning method.

FIG. 9 illustrates an example method 900 for training a machine-learning framework that can be used to achieve techniques described herein. The method can begin with operation 910.

Operation 910 includes obtaining training samples. The training samples are examples of data suitable for training a machine-learning framework. Such data can be real-world or synthetic examples of data. The training samples need not only include positive training samples but also negative training samples. The training samples can further include labels for the samples (e.g., expected output given the sample as input). Following operation 910, the flow of the method 900 can move to operation 920.

Operation 920 can include training a machine-learning framework using the training samples. One or more aspects of the machine-learning framework can be implemented with or based on TENSORFLOW by GOOGLE INC., PYTORCH by the PYTORCH community, and or other open- or closed-source machine-learning libraries. The machine-learning framework can include one or more machine learning models that are structures for learning. The models can include one or more structures representing machine learning nodes (e.g., nodes of a neural network, decision tree, or other kind of neural network), connections between nodes, weights, matrices, other structures, or combinations thereof. The machine-learning framework can define procedures for establishing, maintaining, training, and using the one or more machine learning models. Training the machine-learning framework can include providing training samples as input to the machine learning framework in a useful format, processing the samples with the machine learning framework, and receiving an output from the machine learning framework. The output can be compared with an expected result defined in association with the training samples as part and a loss determined using a loss function (e.g., mean squared error). The machine-learning framework (e.g., one or more models thereof) can be modified based on the output (e.g., based on a difference between the output and the expected result). The process of training and modifying can be repeated until the error is sufficiently small. Following operation 920, the flow of the method 900 can move to operation 930.

Operation 930 can include storing the trained machine-learning framework. For example, the operation 930 can include storing the machine-learning framework in memory for use.

While various descriptions of the aspects of the present disclosure may refer to a surgeon, or surgeons, it is to be understood that the functionality of such aspects may extend to other users, as contextually appropriate, such that the term "surgeon(s)" supports the term "user(s)". In some examples, a surgeon can be a surgical robot. When the user is a surgical robot, the robot can use an electronic surgical plan. If such an electronic plan can be provided automatically, it can dramatically improve workflow since a digital plan does not have to be translated to the robot by a surgeon user.

Examples herein include methods that include operations. Although the operations in each figure are illustrated in a sequential order, the operations can be (in some instances) performed in parallel, and/or in a different order than those described therein. In addition, the various operations may be combined into fewer operations, divided into additional operations, and/or removed based upon the desired implementation.

In addition, diagrams can show the functionality of possible implementations. Operations can represent a module, a segment, or a portion of program code, which includes one or more instructions executable by one or more processors (e.g., CPUs) for implementing specific logical functions or steps in the process. The program code may be stored on any type of computer readable medium, for example, such as a storage device including a disk or hard drive. The computer readable medium may include non-transitory computer-readable media that stores data for short periods, such as register memory, processor cache, or Random Access Memory (RAM), and/or persistent long term storage, such as read only memory (ROM), optical or magnetic disks, or compact-disc read only memory (CD-ROM), for example.

The computer readable media may be able, or include, any other volatile or non-volatile storage systems. The computer readable medium may be considered a computer readable storage medium, a tangible storage device, or other article of manufacture, for example. The computer-readable medium can be communicatively coupled to the one or more processors. The one or more processors can be coupled to one or more interfaces for providing data to or receiving data from one or more users or other devices. Example interfaces include universal serial busses, displays, speakers, buttons, networking components (e.g., wired or wireless networking components), other interfaces, or combinations thereof).

Operations can represent circuitry that is wired to perform the specific logical functions in the process. Illustrative methods can be carried out in whole in or in part by a component or components in the cloud and in a system. However, it should be understood that the example methods may instead be carried out by other entities or combinations of entities (e.g., by other computing devices and/or combination of computer devices), without departing from the scope of the invention. For example, certain operations can be fully performed by a computing device (or components of a computing device such as one or more processors), or can be distributed across multiple components of the computing device, across multiple computing devices, and/or across a server.

Example techniques for implementing such computer functions include frameworks and technologies offering a full stack of plug-and-play capabilities for implementing desktop and browser-based applications (e.g., the applications implementing aspects described herein). The frameworks can provide a desktop web application featuring or using an HTTP server such as NODEJS or KATANA and an embeddable web browser control such as the CHROMIUM EMBEDDED FRAMEWORK or the JAVA/.NET CORE web view. The client-side frameworks can extend that concept by adding plug-and-play capabilities to desktop and the web shells for providing apps capable of running both on the desktop and as a web application. One or more components can be implemented using a set of OWIN (Open Web Interface for .NET) components built by MICROSOFT targeting the traditional .NET runtime. KATANA, and by definition OWIN, allow for chaining together middleware (OWIN-compliant modules) into a pipeline thus offering a modular approach to building web server middleware. For instance, the client-side frameworks can use a Katana pipeline featuring modules such as SIGNALR, security, an HTTP server itself. The plug-and-play capabilities can provide a framework allowing runtime assembly of apps from available plugins. An app built atop of a plug-and-play framework can have dozens of plugins, with some offering infrastructure-level functionality and other offering domain-specific functionality. The CHROMIUM EMBEDDED FRAMEWORK is an open source framework for embedding the CHROMIUM browser engine with bindings for different languages, such as C# or JAVA. OWIN is a standard for an interface between .NET web applications and web servers aiming at decoupling the relationship between ASP.NET applications and IIS by defining a standard interface.

Further example techniques for implementing such computer functions or algorithms include frameworks and technologies provided by or in conjunction with programming languages and associated libraries. For example, languages such as C, C++, C#, PYTHON, JAVA, JAVASCRIPT, RUST, assembly, HASKELL, other languages, or combinations thereof can be used. Such languages can include or be associated with one or more standard libraries or community provided libraries. Such libraries in the hands of someone skilled in the art can facilitate the creation of software based on descriptions herein, including the receiving, processing, providing, and presenting of data. Example libraries for PYTHON and C++ include OPENCV (e.g., which can be used to implement computer vision and image processing techniques), TENSORFLOW (e.g., which can be used to implement machine learning and artificial intelligence techniques), and GTK (e.g., which can be used to implement user interface elements). Further examples include NUMPY for PYTHON (e.g., which can be used to implement data processing techniques). In addition, other software can provide application programming interfaces that can be interacted with to implement one or more aspects described herein. For example, an operating system for the computing environment (e.g., WINDOWS by MICROSOFT CORP., MACOS by APPLE INC., or a LINUX-based operating system such as UBUNTU by CANONICAL LTD.) or another component herein (e.g., an operating system of a robot, such as IIQKA.OS or SUNRISE.OS by KUKA ROBOTICS CORPORATION where the robot is a model of KUKA ROBOTICS CORPORATION) can provide application programming interfaces or libraries to usable to implement aspects described herein. As a further example, a provider of a navigation system, laser console, wireless card, display, motor, sensors, or another component may not only provide hardware components (e.g., sensor, a camera, wireless card, motor, or laser generator), but also software components (e.g., libraries, drivers, or applications) usable to implement features with respect to the components.

What is claimed is:

1. A method for generating custom pedicle screw trajectories comprising:
   receiving a scan of a spine from an imaging device;
   identifying positions of one or more vertebra and one or more components of the one or more vertebra in the scan, including any one of (i) an endplate, (ii) a pedicle, (iii) laminae, (iv) facets, and (v) a combination of (i)-(iv);
   determining, by a screw trajectory planning algorithm stored in a computer, an initial screw trajectory plan using the positions of the one or more vertebra and the one or more components, the initial screw plan trajectory defining an initial position and initial orientation for a screw; and
   determining, by the screw trajectory planning algorithm, a revised screw trajectory plan by revising the initial screw trajectory plan according to weighted factors associated with an entry angle of a selected pedicle screw into the one or more vertebra relative to a reference plane and dimensions of the selected pedicle screw.

2. The method of claim 1, wherein identifying positions of the one or more vertebra and components includes using a vertebral segmentation neural network.

3. The method of claim 1, wherein the initial screw trajectory plan includes an defines the initial position and initial orientation for pedicle screws the pedicle screw having a predetermined pedicle screw length and a predetermined pedicle screw diameter.

4. The method of claim 1, wherein determining the initial screw trajectory plan includes performing an atlas technique.

5. The method of claim 1, wherein the weighted factors comprise weights assigned to parameters associated with any one of (a) a screw length, (b) a screw width, (c) a medial entry angle, (d) a cranial entry angle, (e) an entry point, and (f) any combination of (a)-(f).

6. The method of claim 1, further comprising receiving a selection, from a user, of the weighted factors.

7. The method of claim 1, wherein the weighted factors are associated with a pedicle screw insertion technique, wherein the pedicle screw insertion technique is any one of a Magerl technique, a Roy-Camile technique, an Anderson technique, an Ann technique, an anatomical technique, or a modified technique.

8. The method of claim 7, further comprising:
   implanting one or more pedicle screws into the one or more vertebra based on the revised screw trajectory plan.

9. The method of claim 1, further comprising:
   receiving one or more completed screw trajectory plans; and
   determining the weighted factors using the one or more completed screw trajectory plans.

10. The method of claim 1, further comprising:
    providing the initial screw trajectory plan to a user; and
    receiving one or more modifications to the initial screw trajectory plan, wherein determining the revised screw trajectory plan includes using the one or more modifications.

11. The method of claim 1, wherein the revised screw trajectory plan includes a screw inventory that includes one or more amounts of screws of one or more screw dimensions for performing the revised screw trajectory plan.

12. The method of claim 1, further comprising causing a robotic system to position a robotic component based on the revised screw trajectory plan.

* * * * *